United States Patent
Eick et al.

(10) Patent No.: US 10,302,429 B2
(45) Date of Patent: May 28, 2019

(54) SEISMIC STREAMER SHAPE CORRECTION USING DERIVED COMPENSATED MAGNETIC FIELDS

(71) Applicant: CONOCOPHILLIPS COMPANY, Houston, TX (US)

(72) Inventors: Peter M. Eick, Houston, TX (US); Joel D. Brewer, Houston, TX (US); Tony Maultsby, Katy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 578 days.

(21) Appl. No.: 14/602,435

(22) Filed: Jan. 22, 2015

(65) Prior Publication Data
US 2015/0226554 A1    Aug. 13, 2015

Related U.S. Application Data

(60) Provisional application No. 61/937,170, filed on Feb. 7, 2014.

(51) Int. Cl.
*G01C 17/38* (2006.01)
*G01V 1/38* (2006.01)
*G01C 17/02* (2006.01)

(52) U.S. Cl.
CPC ............ *G01C 17/38* (2013.01); *G01C 17/02* (2013.01); *G01V 1/3835* (2013.01)

(58) Field of Classification Search
None
See application file for complete search history.

(56) References Cited

U.S. PATENT DOCUMENTS

| 4,870,626 A * | 9/1989 | Tveit | G01S 15/88 367/130 |
| 5,761,153 A * | 6/1998 | Gikas | G01V 1/201 367/19 |
| 7,391,673 B2 * | 6/2008 | Regone | G01V 1/3808 367/16 |
| 2002/0092188 A1 | 7/2002 | Smith | |
| 2005/0099177 A1 | 5/2005 | Greelish | |

(Continued)

OTHER PUBLICATIONS

Internation Search Report. PCT/US2015/012487, dated May 1, 2015.

*Primary Examiner* — Tung S Lau
(74) *Attorney, Agent, or Firm* — Conocophillips Company

(57) ABSTRACT

An apparatus for correcting for deviation of an ambient magnetic field direction from a reference direction in a marine environment includes: an instrument assembly vessel configured to move through the marine environment; an inertial reference direction device disposed on the instrument assembly vessel and configured to measure a deviation of an aiming direction of the instrument assembly vessel from the reference direction; a reference magnetic compass disposed on the instrument assembly vessel and configured to measure a direction of the ambient magnetic field direction with respect to the aiming direction of the instrument assembly vessel and to transmit the measured direction; and a processor configured to receive the measured deviation and the measured direction and to calculate the deviation of the ambient magnetic field direction from the reference direction using the received measured deviation and direction.

8 Claims, 4 Drawing Sheets

(56) References Cited

U.S. PATENT DOCUMENTS

| | | | |
|---|---|---|---|
| 2008/0080318 A1* | 4/2008 | Maxwell | G01V 1/16 367/131 |
| 2011/0286301 A1 | 11/2011 | Seale | |
| 2012/0033525 A1 | 2/2012 | Abma et al. | |
| 2012/0069702 A1 | 3/2012 | Muyzert | |
| 2013/0258807 A1 | 10/2013 | Erneland | |

* cited by examiner

Fish

NOT DRAWN TO SCALE

SEISMIC STREAMER SHAPE CORRECTION USING DERIVED COMPENSATED MAGNETIC FIELDS

PRIORITY CLAIM

This application is a non-provisional application which claims benefit under 35 USC § 119(e) to U.S. Provisional Application Ser. No. 61/937,170 filed Feb. 7, 2014, entitled "SEISMIC STREAMER SHAPE CORRECTION USING DERIVED COMPENSATED MAGNETIC FIELDS," which is incorporated herein in its entirety.

FIELD OF THE INVENTION

This invention relates to apparatus and method for accurately determining positions of geophones towed by a seismic vessel in a marine environment. In particular, the invention concerns correcting magnetic compass readings to account for magnetic anomalies in the earth.

BACKGROUND OF THE INVENTION

Seismic streamers are commonly towed by a seismic vessel in a marine environment such as an ocean. The seismic streamers record seismic signals resulting from sound waves that are mechanically generated and sent into the earth beneath the marine environment. Each seismic streamer includes a series of geophones or hydrophones that receive the seismic signals and convert them into electrical signals or some other form of signals. Because seismic streamers can be several kilometers in length, they are generally not extended in straight lines from the vessel, but rather in curved lines that may be determined by several factors such as wind speed and direction and marine current speed and direction.

Each seismic streamer may also include magnetic compasses spaced at intervals along the streamer. Each compass can measure the direction of the earth's magnetic field at certain time intervals and transmit the measurements to the seismic vessel where they can be recorded along with the seismic signals from the hydrophones. By knowing the location of each magnetic compass in the streamers and the individual compass readings, the graphic shape (including distances) of each streamer can be estimated over time. From the graphic shape, the location of each hydrophone with respect to the seismic vessel can be determined. Hence, the seismic signals received by each geophone can be precisely correlated to a position on a marine chart in order to provide an accurate depiction of the earth beneath the marine environment. Unfortunately, anomalies in the earth's magnetic field may cause the measurements by the magnetic compasses to be off by a factor based on the severity of the anomalies as compared to the magnetic north on the marine chart. Errors in measuring magnetic north with respect to the marine chart may then lead to errors in correlating the locations of where the seismic signals were received to locations on the marine chart. This may be particularly problematic near the magnetic poles or in high latitudes. It has also been seen in areas with thick ocean bottom lava flows or abducted basalt section in sedimentary accretion wedges.

SUMMARY OF THE INVENTION

Disclosed is an apparatus for correcting for deviation of an ambient magnetic field direction from a reference direction in a marine environment. The apparatus includes: an instrument assembly vessel configured to move through the marine environment; an inertial reference direction device disposed on the instrument assembly vessel and configured to measure a deviation of an aiming direction of the instrument assembly vessel from the reference direction; a reference magnetic compass disposed on the instrument assembly vessel and configured to measure a direction of the ambient magnetic field direction with respect to the aiming direction of the instrument assembly vessel and to transmit the measured direction; and a processor configured to receive the measured deviation and the measured direction and to calculate the deviation of the ambient magnetic field direction from the reference direction using the received measured deviation and direction.

Also disclosed is an apparatus for estimating a location of each hydrophone in a seismic streamer. The apparatus includes: a seismic streamer having a plurality of hydrophones disposed along a cable in a series and a plurality of magnetic compasses interspersed in the series of hydrophones, each magnetic compass being configured to transmit a measured azimuth to a seismic vessel towing the seismic streamer; an instrument assembly vessel configured to move through the marine environment; an inertial reference direction device disposed on the instrument assembly vessel and configured to measure a deviation of an aiming direction of the instrument assembly vessel from a reference direction; a reference magnetic compass disposed on the instrument assembly vessel and configured to measure a direction of an ambient magnetic field with respect to the aiming direction of the instrument assembly vessel and to transmit the measured direction; and a processor. The processor is configured to receive the measured deviation and the measured direction and to calculate the deviation of the ambient magnetic field direction from the reference direction using the received measured deviation and direction. The processor is further configured to: receive the measured azimuth from each magnetic compass in the plurality of magnetic compasses; receive the calculated deviation of the ambient magnetic field direction from the reference direction; calculate a corrected azimuth for each magnetic compass in the plurality of magnetic compasses using each of the received measured azimuths and the calculated deviation of the ambient magnetic field direction from the reference direction; and estimate the location of each of the hydrophones in the seismic streamer using the corrected azimuth for each magnetic compass in the plurality of magnetic compasses.

Further disclosed is a method for estimating a location of each hydrophone in a seismic streamer. The method includes: towing a seismic streamer with a seismic vessel where the seismic streamer includes a plurality of hydrophones disposed along a cable in a series and a plurality of magnetic compasses interspersed in the series of hydrophones, each magnetic compass being configured to transmit a measured azimuth to the seismic vessel; measuring an azimuth with each magnetic compass in the plurality of magnetic compasses; and disposing an instrument assembly vessel configured to move through a marine environment in a vicinity of the seismic streamer. The instrument assembly vessel includes (a) an inertial reference direction device configured to measure a deviation of an aiming direction of the instrument assembly vessel from a reference direction and (b) a reference magnetic compass configured to measure a direction of an ambient magnetic field with respect to the aiming direction of the instrument assembly vessel and to transmit the measured direction. The method further includes: measuring a first deviation of the aiming direction of the instrument assembly vessel from the reference direction using the inertial reference direction device; measuring a second deviation of an aiming direction of the instrument assembly vessel from the ambient magnetic field direction using the reference magnetic compass; calculating with a processor a deviation of the ambient magnetic field direction from the reference direction using the measured first deviation and second deviation; calculating with a processor a corrected azimuth for each magnetic compass in the plurality of magnetic compasses using each of the received measured azimuths and the calculated deviation of the ambient magnetic field direction from the reference direction; and estimating with a processor the location each of the hydrophones in the seismic streamer using the corrected azimuth for each magnetic compass in the plurality of magnetic compasses.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

The present invention corrects measurements of magnetic north by magnetic compasses in seismic streamers so that the compass measurements are referenced to a reference direction, which may for example be the magnetic north, the grid north or the true north referenced on marine charts. That is, the corrected compass readings will be with respect to magnetic, grid or true north as they appear on the marine charts, for example.

In one embodiment, a "fish" that includes a reference magnetic compass and a non-magnetic inertial reference direction device is towed behind the streamers and far enough away so that the electrical signals being transmitted in streamers do not influence the reference magnetic compass. The non-magnetic inertial reference direction device, such as based on a gyroscope or an inertial sensor, provides a reference direction that is not dependent on the earth's magnetic field. The reference direction is known with respect to true magnetic north or grid north. As the fish is being towed, the deviation between the measurement of the reference magnetic compass and the reference direction is recorded. From the deviation, the recorded uncorrected direction measurements provided by the magnetic compasses in the seismic streamers can be corrected to magnetic north or grid north. From the corrected magnetic compass readings in in each of the magnetic compasses in the streamers, the full scale shape of each streamer can be estimated, and from the full scale shape of the streamers, the location of each hydrophone with respect to a marine chart (or other chart of interest) can be estimated. The term "full scale" relates to the dimensions that provide the shape of the streamer in one-to-one scale.

Figure 1:
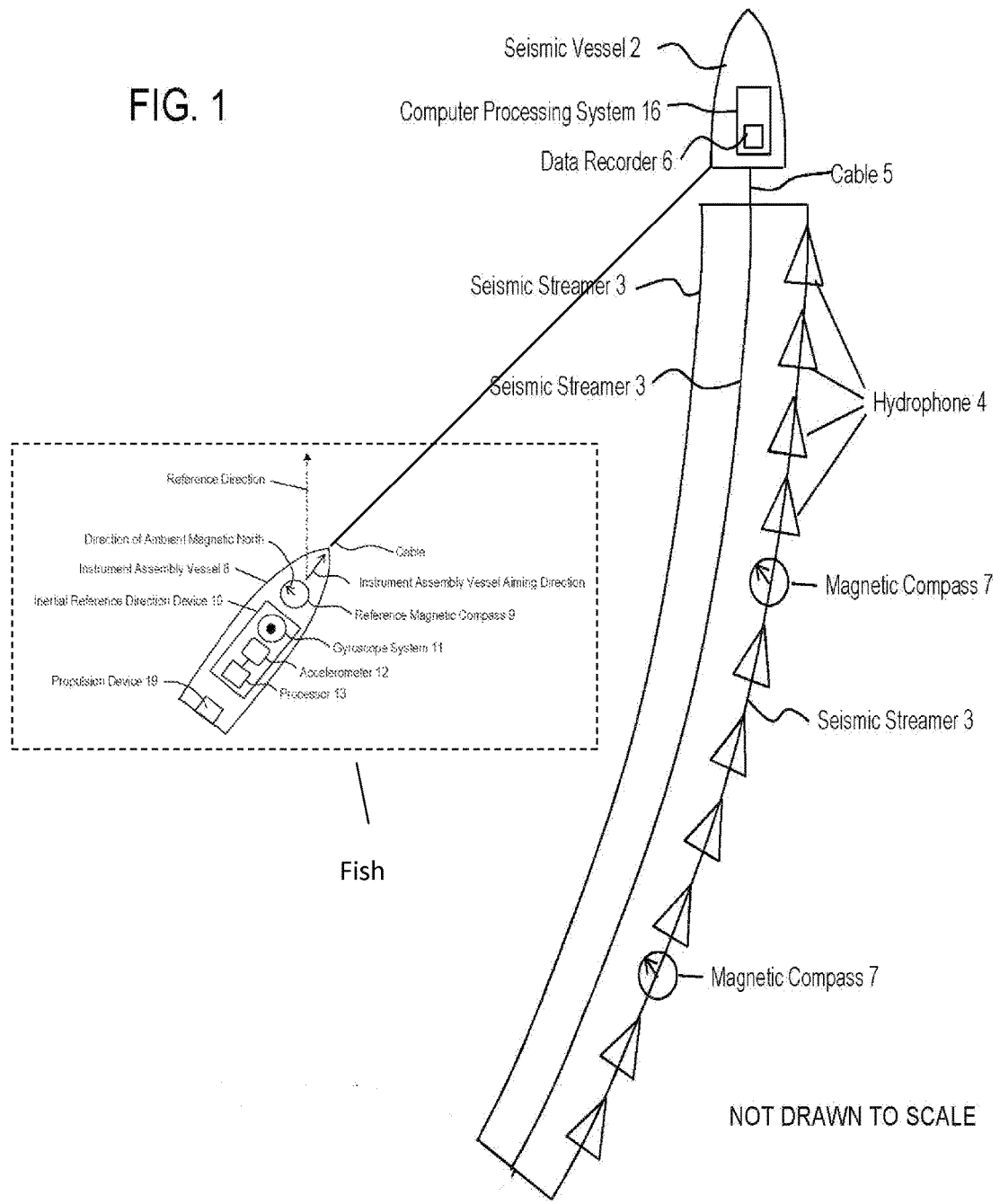
FIG. 1 is a simplified overhead view of a seismic vessel towing a plurality of seismic streamers.

Referring now to FIG. 1, an exemplary embodiment of a seismic vessel 2 towing a plurality of seismic streamers 3 is illustrated in an overhead view. For purposes of illustration, the elements shown in FIG. 1 are not drawn to scale (e.g., seismic vessel 2 would be typically much larger than instrument assembly vessel 8). For example, the seismic vessel may be an ocean-going vessel that is generally much larger than the instrument assembly vessel being towed. In general, the instrument assembly vessel is large enough to carry an assembly of instruments and survive the rigors of the marine environment, but small enough to be stored on the seismic vessel and be managed by the crew.) Each seismic streamer 3 includes a plurality of hydrophones 4 configured to receive seismic signals traveling from the earth and through the water to the hydrophones 4. The received seismic signals are mechanical signals such as acoustic signals and are converted to electrical signals by the hydrophones 4. The electrical signals are transmitted to the vessel 2 using a cable 5, which may include a strength member (not shown) for towing strength and conductors (not shown) for supplying electrical power and communicating signals. The electrical signals are recorded by a recorder 6, which may be part of a processing system 16, on the vessel 2. Each hydrophone 4 is spaced at a known distance along the corresponding seismic streamer 3.

As illustrated in FIG. 1, each seismic streamer 3 includes a plurality of magnetic compasses 7. Each magnetic compass 7 is spaced at a known distance along the corresponding seismic streamer 3. Each magnetic compass 7 is configured to measure or sense a magnetic direction of the earth's magnetic field at intervals over time and to transmit the measurements to the seismic vessel where they are recorded by the recorder 6. In one or more embodiments, the time at which each direction measurement was performed is correlated to the time at which the seismic signals were recorded by hydrophones closest to a nearby magnetic compass 7.

Still referring to FIG. 1, an instrument assembly vessel (also referred to as the "fish" and drawn significantly out of scale in proportion to the streamer to the right on the FIG. 8 is towed behind the seismic streamers 3 at an appropriate distance so that the seismic signals and compass signals in the streamers 3 will not affect measurements performed by the instrument assembly vessel 8. It can be appreciated that the fish 8 may be towed in other positions such as to a side of the vessel 2 at an appropriate distance from the streamers 3 such as by using an out-rigger (not shown). The appropriate distance is generally dependent on the magnitude of the electrical current carrying the signals in the streamers and any magnetization of metal in the streamers. The fish 8 is configured to float or maintain a certain depth in the water and may include a propulsion system 19 for remote control or autonomous operation in lieu of being towed.

The fish 8 includes a reference digital magnetic compass 9 and an inertial reference direction device 10. The inertial reference direction device 10 is configured to provide an output signal that is indicative of an amount of rotational change of the fish 8 from a set reference direction such as chart magnetic north, grid north or true north as shown on a marine chart. Other reference directions of interest may also be used as determined by a user. The inertial reference direction device 10 is generally non-magnetic so as not to influence the reference compass 9. In one or more embodiments, the inertial reference direction device 10 includes a gyroscope system 11 disposed within a housing 14 that is connected to the fish 8 such that the output signal is indicative of the amount of rotation (such as about a vertical axis) of the fish 8 with respect to the reference direction.

In one or more embodiments, the inertial reference direction device 10 includes a tri-axial accelerometer 12 coupled to a processor 13. The processor 13 is configured to calculate directional or rotational changes (e.g., twisting about a vertical axis) of the fish 8 from a programmed or set reference direction using input from the tri-axial accelerometer 12. In one or more embodiments, double integration of the output of the accelerometer 12 can provide the displacement of the fish 8 in three orthogonal directions and, thus, provide the total change in direction to which the fish 8 is aimed from the reference direction.

The reference magnetic compass 9 is physically connected to the fish 8 and is configured to sense a direction of an ambient magnetic field to which the reference magnetic compass is exposed. The direction may be with respect to an aiming direction of the compass body and thus the fish 8 to which the compass 9 is attached. The reference digital magnetic compass 9 is configured to output a signal that is indicative of the direction of the ambient magnetic field with respect to the aiming direction. The compass 9 output signal may be transmitted to the recorder 6 or processing system 16 in non-limiting embodiments.

Figure 2:
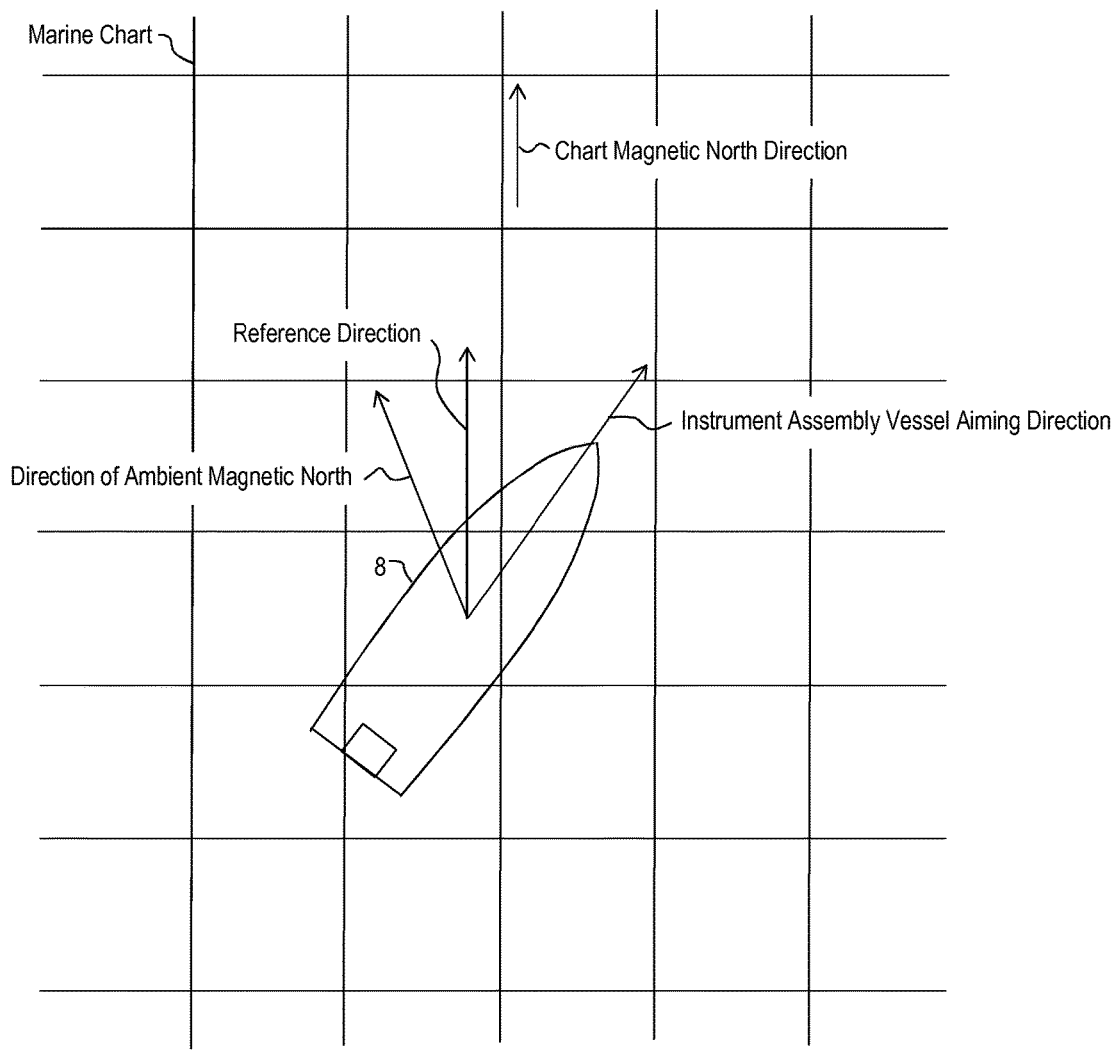
FIG. 2 depicts aspects of determining deviation of ambient magnetic field direction from a reference direction using a towed instrument assembly.

The processing system 16 is configured to receive the output signal from the reference digital magnetic compass 9 and the output signal from inertial reference direction device 10. In that the compass 9 signal is the deviation of the ambient magnetic field direction from the aiming direction of the fish 8 and the inertial device 10 output signal is the amount of rotation of the aiming direction of the fish 8 with respect to the set reference direction of interest, the processor is able to calculate the deviation of the magnetic field with respect to the set reference direction of interest. For example, if the fish aiming direction is not changed from the set reference direction, then the compass 9 output signal is the deviation of the ambient magnetic field direction from the set reference direction. If the aiming direction of the fish 8 is offset from the set reference direction, then the compass 9 output signal is adjusted by the amount of the change of the fish aiming direction from the set reference direction. Using a specific example with reference to FIG. 2 where the fish aiming direction is +10° from the set reference direction (measured by the inertial device 10) and the ambient magnetic field direction (measured by the compass 9) is −20° from the fish aiming direction, then the processing system calculates the deviation of the ambient magnetic field direction from the set reference direction as −10° (+10°−20°=−10°).

Figure 3:
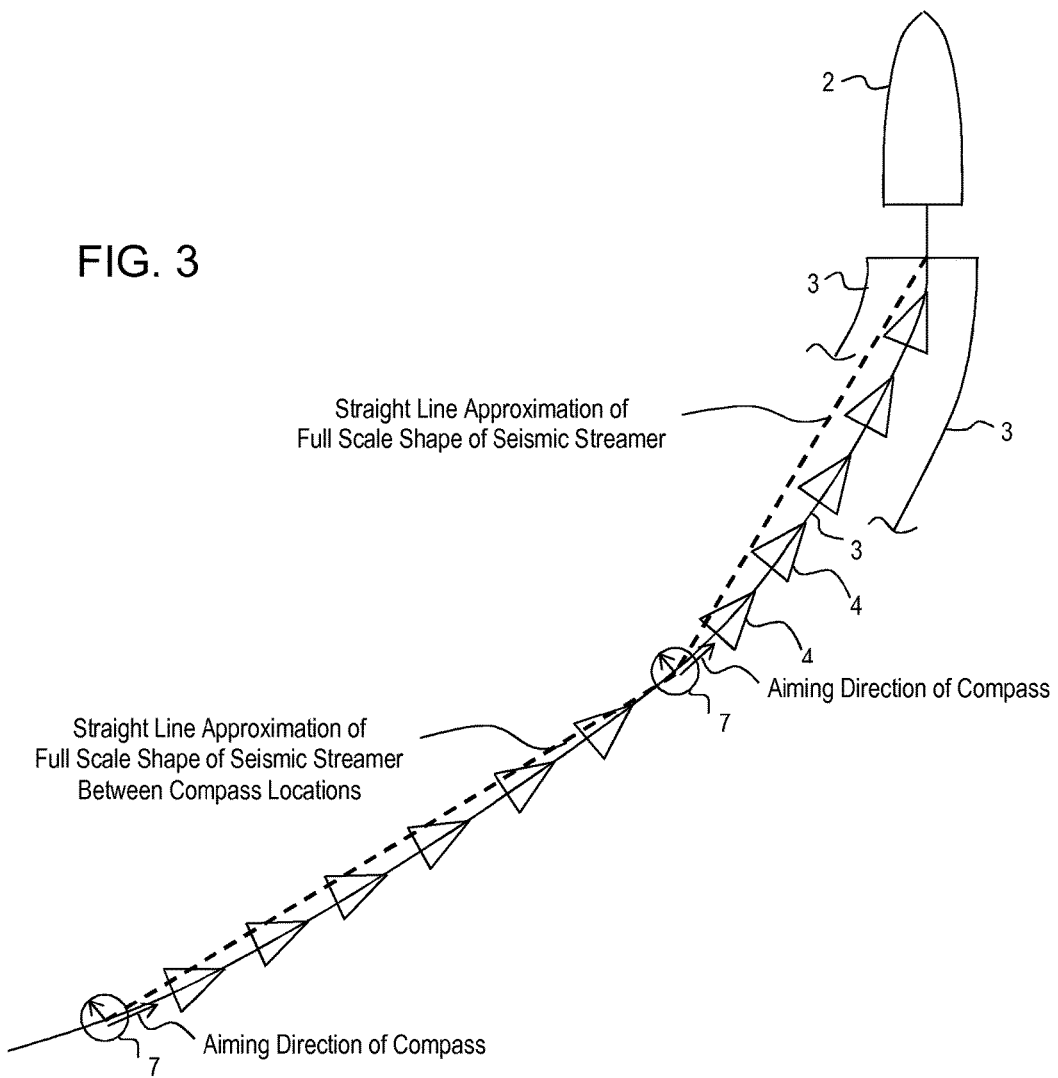
FIG. 3 depicts aspects of estimating a full scale shape and locations of hydrophones in the seismic streamers.

Turning now to FIG. 3, a simplified overhead view of the streamers 3 is presented for illustrating one embodiment of how locations of the hydrophones 4 are estimated. In this embodiment, it is assumed that the hydrophones 4 are disposed along straight lines between locations of the magnetic compasses 7. In one or more embodiments, the angle of a straight line is modeled as the average of the magnetic compasses 7 at the ends of the straight lines. It can be appreciated that other protocols may be used to assign the angles to the straight lines such as using the angle of the compass 7 that leads a sub-series of hydrophones or the compass 7 that trails a sub-series of hydrophones. Using trigonometry and knowing the spacing between hydrophones, the location of each hydrophone 4 may be calculated with respect to the seismic vessel 2. By knowing the location of the seismic vessel 2 on a chart, such as by using Global Position Navigation (GPS) system or other known location determining device, the location of each hydrophone 4 may also be plotted on the chart. It can be appreciated that other mathematical methods may be used to estimate the full scale shape of the streamers and that these methods may model the streamers as curved lines. In one example, nodal analysis may be used taking into account wind speed and direction and water current speed and direction. The nodal analysis problem may be solved using the relative positions of the hydrophones 4 and magnetic compasses 7 with respect to each other and the readings of the compasses 7 as boundary conditions.

Figure 4:
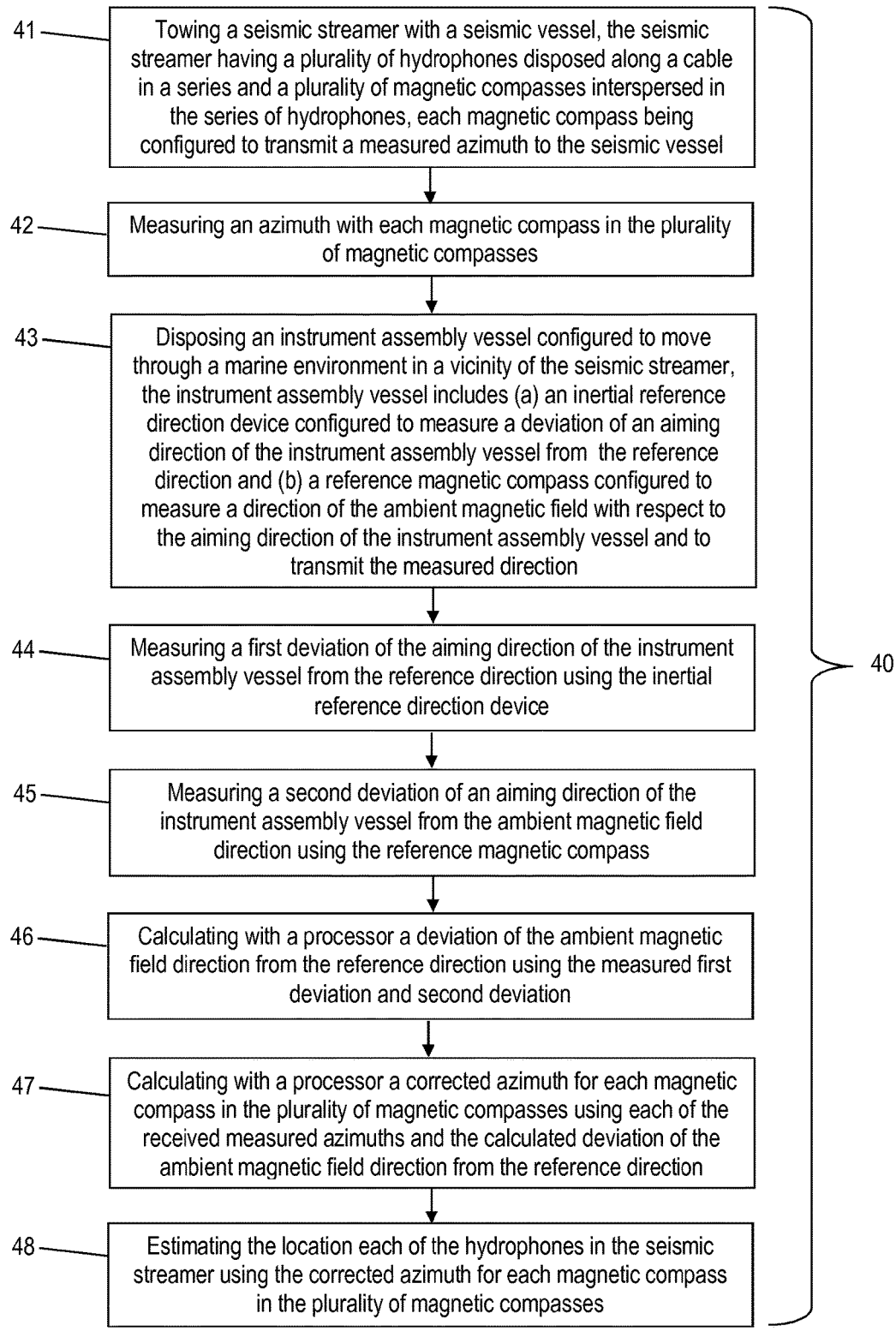
FIG. 4 is a flow chart for a method for determining a location of each hydrophone in the seismic streamers towed by a seismic vessel.

Turning now to FIG. 4, a flow chart for one example of a method 40 for estimating a location of each hydrophone in a seismic streamer is presented. Block 41 calls for towing a seismic streamer with a seismic vessel, the seismic streamer comprising a plurality of hydrophones disposed along a cable in a series and a plurality of magnetic compasses interspersed in the series of hydrophones, each magnetic compass being configured to transmit a measured azimuth to the seismic vessel. Block 42 calls for measuring an azimuth with each magnetic compass in the plurality of magnetic compasses. Bock 43 calls for disposing an instrument assembly vessel configured to move through a marine environment in a vicinity of the seismic streamer, the instrument assembly vessel comprising (a) an inertial reference direction device configured to measure a deviation of an aiming direction of the instrument assembly vessel from the reference direction and (b) a reference magnetic compass configured to measure a direction of an ambient magnetic field with respect to the aiming direction of the instrument assembly vessel and to transmit the measured direction. Block 44 calls for measuring a first deviation of the aiming direction of the instrument assembly vessel from the reference direction using the inertial reference direction device. Block 45 calls for measuring a second deviation of an aiming direction of the instrument assembly vessel from the ambient magnetic field direction using the reference magnetic compass. Block 46 calls for calculating with a processor a deviation of the ambient magnetic field direction from the reference direction using the measured first deviation and second deviation. Block 47 calls for calculating with a processor a corrected azimuth for each magnetic compass in the plurality of magnetic compasses using each of the received measured azimuths and the calculated deviation of the ambient magnetic field direction from the reference direction. Block 48 calls for estimating the location each of the hydrophones in the seismic streamer using the corrected azimuth for each magnetic compass in the plurality of magnetic compasses.

It can be appreciated that the above disclosed techniques may inherently correct for other physical phenomena, such as a mass corona discharge from the sun for example, that may cause a deviation of the ambient magnetic field direction from the chart magnetic field direction.

In support of the teachings herein, various analysis components may be used, including a digital and/or analog system. For example, the recorder 6, the computer processing system 16, the processor 13, the magnetic compasses 7, the reference magnetic compass 9, and/or the inertial reference direction device 10 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of non-transitory computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), motive force (such as a translational force, propulsion force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A method for estimating a location of each hydrophone in a seismic streamer, the method comprising:

towing, via a seismic vessel, a seismic streamer comprising a plurality of hydrophones disposed along a cable in a series and a plurality of magnetic compasses interspersed between the plurality of hydrophones;

measuring, via the plurality of magnetic compasses, a plurality of azimuths, each of the plurality of magnetic compasses measuring one of the plurality of azimuths and transmitting the one of the plurality of azimuths to the seismic vessel;

towing, via the seismic vessel, an instrument assembly vessel while the plurality of azimuths are measured by the plurality of magnetic compasses, the instrument assembly vessel comprising (a) an inertial reference direction device configured to measure a deviation of an aiming direction of the instrument assembly vessel from a reference direction, and (b) a reference magnetic compass configured to measure an ambient magnetic field direction with respect to the aiming direction of the instrument assembly vessel and to transmit the ambient magnetic field direction;

measuring a first deviation of the aiming direction of the instrument assembly vessel from the reference direction using the inertial reference direction device;

measuring a second deviation of the aiming direction of the instrument assembly vessel from the ambient magnetic field direction using the reference magnetic compass;

calculating a third deviation of the ambient magnetic field direction from the reference direction using the first deviation and the second deviation;

calculating a corrected azimuth for each of the plurality of magnetic compasses using the plurality of azimuths and the third deviation;

estimating a location of each of the plurality of hydrophones using the corrected azimuth for each of the plurality of magnetic compasses; and displaying the location of each of the plurality of hydrophones.

2. The method according to claim 1, wherein the location of each of the plurality of hydrophones is with respect to the seismic vessel.

3. The method according to claim 1, wherein the instrument assembly vessel is towed behind the streamer.

4. The method according to claim 1, wherein the instrument assembly vessel is towed off a side of the seismic vessel using another cable.

5. The method according to claim 1, further comprising: estimating a full scale shape of the seismic streamer using the corrected azimuth.

6. The method according to claim 5, wherein the full scale shape is estimated by approximating a shape of the plurality of hydrophones as a straight line.

7. The method according to claim 5, wherein the location of each of the plurality of hydrophones is displayed by plotting, via a chart, the location of each of the plurality of hydrophones.

8. The method according to claim 7, wherein the plotting of the location of each of the plurality of hydrophones on the chart is performed using a known location of the seismic vessel on the chart.

* * * * *